Sept. 17, 1963    E. L. ALLEN ETAL    3,103,837
WIRE CUTTING AND INSULATION STRIPPING DEVICE
Filed Nov. 30, 1961    2 Sheets-Sheet 1

INVENTORS
EDWARD L. ALLEN
JOHN A. MOORE
BY
David W. Tibbott
THEIR ATTORNEY

3,103,837
WIRE CUTTING AND INSULATION STRIPPING DEVICE

Edward L. Allen, Ulster, and John A. Moore, South Montrose, Pa., assignors to Ingersoll-Rand Company, New York, N.Y., a corporation of New Jersey
Filed Nov. 30, 1961, Ser. No. 155,964
5 Claims. (Cl. 81—9.5)

This invention relates to devices for cutting and stripping insulation from the end portion of a wire prior to connecting it in an electrical circuit junction.

It is conventional to form an electrical joint by helically wrapping the end portion of a wire tightly around an elongate terminal. This is normally done using a portable power operated wire wrapping tool having a rotary shaft or bit adapted to grab the end portion of the wire and wind it convolutely around the terminal. When using insulated wire, a portion of the insulation must be removed from the end of the wire before it is wrapped around the terminal by the wire wrapping tool.

The principal object of this invention is to provide a wire cutting and insulation stripping device adapted to be mounted on a conventional portable wire wrapping tool where it is convenient and handy for use by the operator of the wire wrapping tool.

Other important objects of this invention are: to provide a wire stripping device which strips a selected or predetermined length of insulation from a wire; to provide an easily operated, reliable and inexpensive tool for cutting and stripping insulation from a wire; to provide a wire stripping tool which can be adjusted to cut and strip different predetermined lengths of insulation from a wire; and to provide an insulation stripping tool which simultaneously severs a wire and cuts the insulation at a predetermined distance from the severed end of the wire.

These objects are broadly attained by providing a frame, mounting an elongate shaft on the frame, mounting a pair of relatively movable wire cutting jaws on the shaft with one jaw being fixed to the frame, mounting a pair of relatively movable insulation stripping jaws on the shaft at a given distance from the wire cutting jaws with one of the insulation stripping jaws being fixed on the frame, and mounting a lever on the shaft adapted to be operated by the hand of an operator and being connected to the movable jaws of each pair of jaws to close said jaws simultaneously on a wire located between the pairs of jaws. This wire stripping device can be mounted on the casing of a conventional power operated wire wrapping tool where it is convenient and handy for the operator of the tool.

Also, the insulation stripping jaws can be adjusted over a relatively wide range of selected distances from the wire cutting jaws to strip a variety of different predetermined lengths of insulation from the end of a wire.

Figure 1:
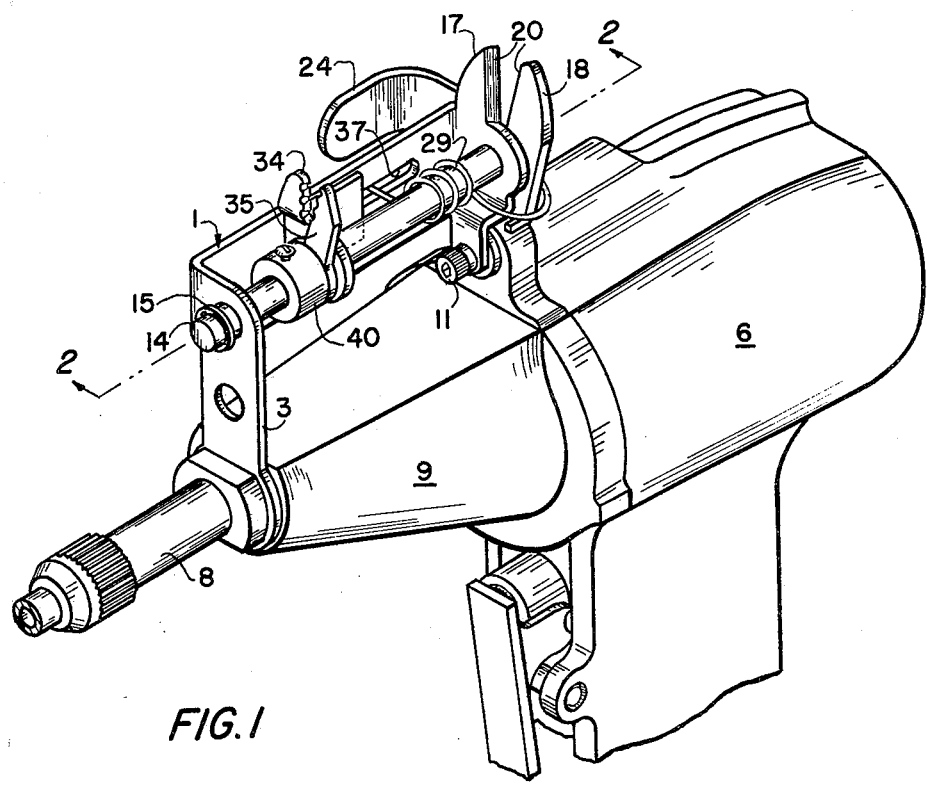
FIG. 1 is a perspective view of a wire cutting and stripping device made in accordance with this invention and mounted on a conventional portable wire wrapping tool.

The embodiment of this invention shown in the drawing includes an inverted U-shaped frame 1 composed of an intermediate bight 2 integrally joined at its opposite ends to front and rear legs 3 and 4 respectively. The U-shaped frame 1 is formed from a single sheet of metal and has the legs 3 and 4 bent to lie in spaced parallel planes running at right angles to the plane of the bight 2. When mounted on a conventional portable power operated wire wrapping tool 6, as shown in FIG. 1, the frame legs 3 and 4 extend upwardly from the top of the tool 6 and the bight 2 extends horizontally between the side edges of the spaced frame legs 3 and 4.

The front leg 3 of the frame includes a hole 7 at its lower end adapted to fit over the spindle 8 and seat against the nose 9 of the tool 6. The rear leg 4 is bent to a Z-shape and is provided with an opening 10 in its lower end adapted to receive a bolt 11 which is threaded into the casing of the wire wrapping tool 6.

An elongate horizontal shaft 14 extends between the frame legs 3 and 4 and is rotatably mounted or journaled in the upper ends of the frame legs. The front end of the shaft 14 is loosely journaled in the front leg 3 so that it can wobble in it for a purpose that will be explained later, and carries a clip 15 for limiting rearward axial movement of the shaft in the frame legs.

Figure 4:
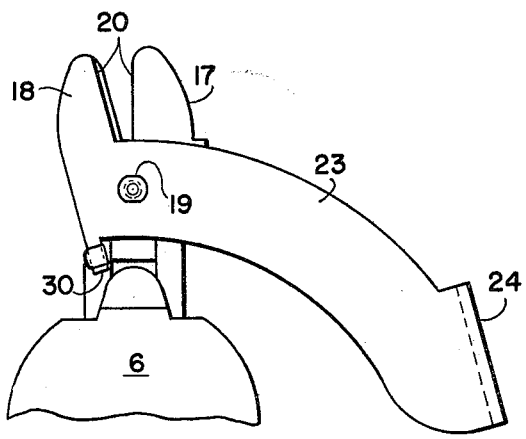
FIG. 4 is a vertical section taken along line 4—4 in FIG. 2 and showing a portion of the wire wrapping tool supporting the wire cutter and stripper.

A pair of wire cutting or severing jaws 17 and 18 is mounted at the rear of the frame. One wire cutting jaw 17 is integrally formed on the frame 1 and is simply an upward extension of the frame rear leg 4. The other jaw 18 is fixed on the rear end of the shaft 14 to rotate with it. This function is performed by keying the jaw 18 on flats 19 formed on the shaft 14, as shown in FIG. 4. Both of the wire cutting jaws 17 and 18 are provided with cooperating cutting edges 20 adapted to pinch and shear a wire located between them when they are closed on the wire.

A lever 23 is formed integrally with the movable wire cutting jaw 18 and is arranged to extend outwardly and downwardly over the right side of the wire wrapping tool 6, as shown in FIG. 4. The outer end of the lever 23 is bent forwardly to form a finger engagement tab 24. Swinging the lever 23 downwardly and inwardly toward the wire wrapping tool 6 swings the movable wire cutting jaw 18 to a closed position on its fixed jaw 17 and correspondingly rotates the shaft 14 in its bearings.

The movable jaw 18 and its integral lever 23 are secured on the flats 19 of the shaft 14 by a suitable washer 25 and a bolt 26 threaded axially into the end of the shaft 14. The mounting of the integral jaw 18 and lever 23 on the rear end of the shaft 14 limits and prevents the shaft from sliding axially forward in the frame legs 3 and 4.

A suitable coil spring 29 is wrapped around the rear portion of the shaft 14 and arranged to bias the movable jaw 18 toward an open position with its fixed jaw 17. The movable jaw 18 is further provided with a stop 30 to abut the rear frame leg 4 and limit the opening movement of the jaw 18, as shown in FIG. 4.

A pair of insulation cutting and stripping jaws 34 and 35 is mounted on the forward part of the wire cutting and stripping device with one jaw 34 being adjustably fixed to the frame 1 and the other jaw 35 being adjustably keyed on the shaft 14. The frame fixed jaw 34 includes an integral rearwardly bent tongue 36 which is adjustably attached in a horizontal slot 37 of the frame bight 2 by a pair of screws 38. The fixed jaw 34 is adjusted to various positions along the frame bight 2 simply by loosening the screws 38 and sliding the jaw 34 along the slot 37.

Figure 2:
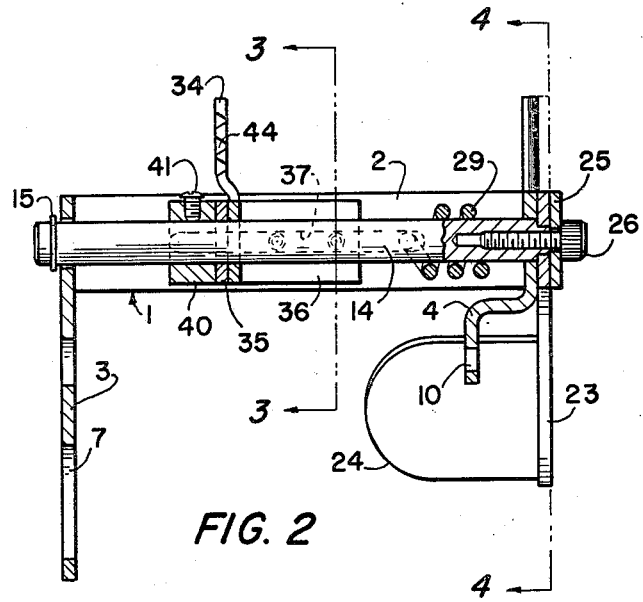
FIG. 2 is a vertical sectional of the wire cutter and stripper taken along its length, as indicated by line 2—2 in FIG. 1, with the wire wrapping tool being omitted.
Figure 3:
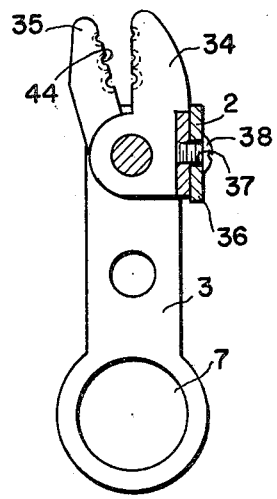
FIG. 3 is a vertical sectional taken along line 3—3 in FIG. 2.

The movable jaw 35 is attached at one end of a sleeve 40 which is slidably mounted on the shaft 14 and includes one or more set screws 41 for fixing and keying the jaw 35 at various selected positions along the shaft. In adjusting the insulation stripping jaws 34 and 35 at various distances from the wire cutting jaws 17 and 18, both of the jaws 34 and 35 should be located in the same transverse plane to provide for the proper cutting action between their cutting edges. It should be noted, in FIG. 2, that the outer portion of the fixed jaw 34 is offset from its inner portion so that it can lie in the same plane with the movable jaw 35.

Both of the cutting edges of the wire stripping jaws 34 and 35 have several sets of cooperating cut-outs or notches 44 in their cutting edges to receive wire therein during the insulation cutting operation for preventing the wire from being cut. These notches 44 are shaped to accommodate various gauges of wire.

The fixed wire stripping jaw 34 includes an inner portion which surrounds and rotatably supports the shaft 14, thus serving as a bearing for the front portion of the shaft 14. The front end of the shaft 14 is arranged to wobble in the front leg 3 of the frame 1 so that it does not bind when the fixed jaw 34 is moved to various different positions along the shaft 14, due to any misalignment which might otherwise occur between the front leg bearing and the fixed jaw bearing.

The operation of the wire stripping device is believed to be obvious. After it is mounted on the portable wire wrapping tool 6 and the insulation stripping jaws 34 and 35 are adjusted relative to the wire cutting jaws 17 and 18 to strip a predetermined length of insulation from a wire, the wire is laid in the open jaws 17, 18, 34, and 35 by an operator and held with the wire located approximately between the notches 44 of the insulation stripping jaws 34, 35 adapted to accommodate the specific gauge of the wire. Thereafter, the operator pushes downwardly and inwardly on the lever 23 to cause both pairs of jaws to close simultaneously. The wire is severed completely by the wire cutting jaws 17 and 18 and simultaneously has its insulation cut by the stripper jaws 34 and 35 at the desired distance from the severed end of the wire. The inner wire fits into the notches 44 of the insulation stripper jaws 34 and 35 and is not cut by these jaws.

Following the closing of the jaws, they are held closed and the operator pulls the wire axially forward from the stripper jaws 34 and 35, which abut and strip the end portion of the insulation from the wire and prepare the wire for being wrapped around a terminal by the wire wrapping tool 6. At the end of the wire stripping operation, the operator releases the lever 23 to allow the spring 29 to open the jaws, wherein they are ready to repeat the operation.

While in accordance with the patent statutes a preferred embodiment of the invention has been illustrated and specifically described in detail, it should be recognized that the invention can be changed in various ways or aspects without changing the general concept of the invention and, therefore, this invention is not considered to be limited to the described embodiment.

Having described our invention, we claim:

1. A wire cutting and insulation stripping device comprising:
   (a) a supporting frame including bracket means adapted to be fixed to a portable wire wrapping tool for supporting said device on the tool;
   (b) an elongate shaft rotatably mounted on said frame;
   (c) a pair of wire cutting jaws mounted on said shaft with one of said jaws fixed to said frame and the other jaw being movable relative to the fixed jaw;
   (d) a pair of insulation stripping paws mounted on said shaft at a predetermined distance from the pair of wire cutting jaws, one of said pair of insulating stripping jaws being fixed to said frame and the other being movable relative to the fixed jaw;
   (e) a lever mounted on said shaft in a position to be operated by an operator's hand and being connected to the relatively movable jaw of at least one pair of jaws to move said movable jaw relative to its companion jaw; and
   (f) means interconnecting said movable jaws together so that both of said movable jaws will be moved simultaneously relatively to their companion jaws fixed on said frame whereby an insulated wire resting between the pairs of jaws will be simultaneously severed by said wire cutting jaws and have its insulation cut by said wire stripping jaws so that the insulation can be stripped by withdrawing the wire axially from between the wire stripping jaws.

2. The device of claim 1 wherein said pair of insulation stripping jaws are mounted on said shaft for adjustment along it relative to said pair of wire cutting jaws.

3. The device of claim 1 wherein:
   (a) the movable jaw of each pair of jaws is keyed on said shaft to rotate with it; and
   (b) said lever is fixed on said shaft to rotate it for simultaneously closing both of said pairs of jaws.

4. The device of claim 1 including spring means for biasing each of said pairs of jaws to open positions.

5. The device of claim 1 wherein said frame is U-shaped and includes a pair of spaced legs adapted to be attached to the casing of a portable wire wrapping tool.

References Cited in the file of this patent

UNITED STATES PATENTS

| 546,192 | Schnauder | Sept. 10, 1895 |
| 1,406,486 | Perlman | Feb. 14, 1922 |
| 1,632,004 | Hampton | June 14, 1927 |
| 1,733,294 | Cross | Oct. 29, 1929 |

FOREIGN PATENTS

| 548,824 | France | Nov. 3, 1922 |